US006925410B2

(12) United States Patent
Narayanan

(10) Patent No.: US 6,925,410 B2
(45) Date of Patent: Aug. 2, 2005

(54) SELECTING A TARGET DEVICE IN A DEVICE NETWORK

(75) Inventor: Ajith Kumar Narayanan, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 10/010,104

(22) Filed: Nov. 8, 2001

(65) Prior Publication Data

US 2002/0082026 A1 Jun. 27, 2002

(30) Foreign Application Priority Data

Nov. 27, 2000 (SG) ...................................... 200006973-2

(51) Int. Cl.$^7$ ......................... G01C 19/00; G06F 19/00; G06F 3/00
(52) U.S. Cl. ......................... 702/150; 244/3.18; 345/8; 340/825.72; 700/192; 700/245; 735/39
(58) Field of Search ................................ 702/150, 152; 175/24, 26, 45, 73; 340/825.72; 342/374; 345/8, 158; 348/734; 398/151, 119; 700/192, 245; 735/39

(56) References Cited

U.S. PATENT DOCUMENTS

| | | | | |
|---|---|---|---|---|
| 3,312,423 A | * | 4/1967 | Welch ........................ | 244/3.18 |
| 4,433,382 A | * | 2/1984 | Cunningham et al. ...... | 700/192 |
| 4,959,721 A | | 9/1990 | Micic et al. ................ | 348/734 |
| 5,506,717 A | | 4/1996 | Kho ........................... | 398/151 |
| 5,528,264 A | | 6/1996 | Kautzer et al. ............. | 345/158 |
| 5,650,831 A | | 7/1997 | Farwell ....................... | 348/734 |
| 5,767,807 A | | 6/1998 | Pritchett .................... | 342/374 |
| 5,880,867 A | | 3/1999 | Ronald ....................... | 359/152 |
| 5,963,145 A | | 10/1999 | Escobosa ................ | 340/825.72 |
| 5,966,680 A | * | 10/1999 | Butnaru ...................... | 702/150 |
| 6,028,764 A | | 2/2000 | Richardson et al. ........ | 361/681 |
| 6,078,575 A | | 6/2000 | Dommety et al. .......... | 370/338 |
| 6,289,263 B1 | * | 9/2001 | Mukherjee .................. | 700/245 |
| 6,630,915 B1 | * | 10/2003 | Flood ........................... | 345/8 |

FOREIGN PATENT DOCUMENTS

WO  WO 01/33838 A1  5/2001  .......... H04N/5/445

OTHER PUBLICATIONS

PCT/GB 01/05071, Filed Nov. 16, 2001, Notification of Transmittal of the International Search Report or the Declaration, 4 pgs.

* cited by examiner

Primary Examiner—Michael Nghiem
Assistant Examiner—John Le
(74) Attorney, Agent, or Firm—Ido Tuchman; E. Dwayne Nelson

(57) ABSTRACT

A device network to process signals has target devices, selecting devices that are movable relative to the target devices, and controllers. The controllers are in communication with the target devices and the selecting devices. Each of the selecting devices has a position sensor and an orientation sensor to provide spatial and angular co-ordinates of position and orientation when pointing to a target device and upon receiving a user input. Each of the selecting devices also has a signal processor to generate a control signal having the position and orientation data. This control signal is then transmitted by a transmitter, via a radio frequency channel, to a controller. Upon receiving the control signal, the controller determines whether, for example, a target device has been selected by a selecting device by comparison of the orientation data with a derived orientation based on the position data and the known position of the target devices.

24 Claims, 6 Drawing Sheets

SELECTING A TARGET DEVICE IN A DEVICE NETWORK

FIELD OF THE INVENTION

The invention is applicable to devices operating in a network environment. In particular, this invention relates to device networks, devices and a method for selecting a target device in a device network.

BACKGROUND OF THE INVENTION

In a device network, devices such as printers, workstations, or mobile terminals are operably linked to process information using communication resources such as wireless channels or cables. The information includes, for example, data for processing by the devices or control signals for controlling such devices. Typically, data or control signals are provided from one or more devices to one or more other devices. Devices that receive data usually process such data based on control signals associated with the data.

Generally, devices that receive data, referred to hereinafter as "target devices", have to be selected prior to receiving and processing the data. Selection of a target device includes identifying that target device and is usually done by a user who, via a selecting device, provides one or more control signals that includes selection criteria to select the target device (e.g. a printer). The selecting device can be, for example, a handheld mobile terminal (e.g. a Personal Digital Assistant (or PDA)) at which the user provides the selection criteria. After receiving the selection criteria, a target control signal is generated and transmitted from the selecting device to a controller for controlling the target device. In response to the target control signal, the controller sets the target device to receive the data via the communication resources, whereupon, the target device is able to be utilised.

Communicating control signals to select target devices requires communication elements such as transmitters and receivers that are either a part of the devices or are coupled to such devices. To communicate data or control signals to, for example, a printer, a user has to provide selection criteria that identify the printer. A device address, when known a priori, is typically used as a selection criteria. However, selection by physically pointing to the device is more natural and user friendly, and does not require knowledge of device address.

One existing technique to perform selection by physically pointing at the device is described, for example, in U.S. Pat. No. 5,963,145, issued to Escobosa on Oct. 5, 1999. This patent describes a system having a hand held transmitter that transmits position signals at different infrared frequencies, and along divergent pointing axes, towards a device to be selected. Based on the signal strength of these position signals, a sensor coupled to the selected device determines position of the hand held transmitter. However, in the system as described in U.S. Pat. No. 5,963,145, interference problems are likely when more than one hand held transmitter is used at the same time. Such interference problems arise because target devices that receive the position signals have to be wide-angle sensitive (for example, due to the use of a wide-angle photo-diode), and this allows interfering signals to be received in addition to desired control signals. A second disadvantage of the system as described in U.S. Pat. No. 5,963,145 is that it mandates the use of IR.

In PDAs, mobile terminals and printers, provision for RF wireless communication (for example, using Bluetooth™, which is described in http://www.bluetooth.com) is rapidly replacing IR communication. These devices are typically fitted with omni-directional antennas. As such, in this context, directional techniques such as described in U.S. Pat. No. 5,963,145 are rendered useless.

Therefore, in view of the above limitations of existing techniques to select a target device, a need clearly exists for an apparatus and method for selecting the target device in a device network that is feasible in the context of non-directional wireless communication, without requiring additional support of directional communication such as IR, and is devoid of the aforementioned drawbacks of the IR based system.

SUMMARY OF THE INVENTION

The invention discloses a device network having selectable target devices, said device network comprising:

a controller device;

one or more target devices in communication with said controller device; and one or more selecting devices, each of which is movable relative to said target devices, and includes:

means for sensing position and orientation to provide data therefor;

means for generating at least one control signal, incorporating said position and orientation data in response to a user input; and means for transmitting said control signals via at least one of a plurality of communication resources to said controller device; and wherein said controller device acquires and stores actual location information for each target device, and assesses correspondence of said position and orientation data with said actual location data, and if there is correspondence, outputs a control signal to select said target device to be operative.

There is further disclosed a selecting device for selecting one or more target devices in a device network, said selecting device comprising:

means for sensing position and orientation to provide data therefor;

means for generating at least one control signal, incorporating said position and orientation data, in response to a user input; and means for transmitting said control signals via at least one of a plurality of communication resources to said controller device.

There is yet further disclosed a method for selecting one or more target devices in a device network, said method comprising the steps of:

generating a control signal from a selecting device, said control signal having position and orientation data of said selecting devices;

determining whether said one or more target devices can be identified based on said position and orientation data; and generating a target control signal to activate an identified target device The controller can assess correspondence from the selecting device position and orientation and the actual target location by deriving a target orientation, and determining correspondence of said target orientation with said orientation data. The orientation data can include angles between a ray joining the respective points in a three-dimensional Cartesian system and two respective axes of said system. The position sensing means may comprise an accelerometer whose output is doubly integrated to give an output of position, or a positioning means using Ultra Wide Band (UWB). Also, the orientation sensing means can comprise a gyroscope.

BRIEF DESCRIPTION OF THE DRAWINGS

Embodiments of the invention are described hereinafter with reference to the drawings, in which.

DETAILED DESCRIPTION AND BEST MODE

Device networks, a selecting device, a target device and a method for selecting a target device in the device networks in accordance with preferred embodiments of the invention are described. In the following, numerous details are provided for a more thorough description. It shall be apparent to one skilled in the art, however, that the invention may be practised without such details. In other instances, well-known details have not been described at length so as not to obscure the invention.

Figure 1:
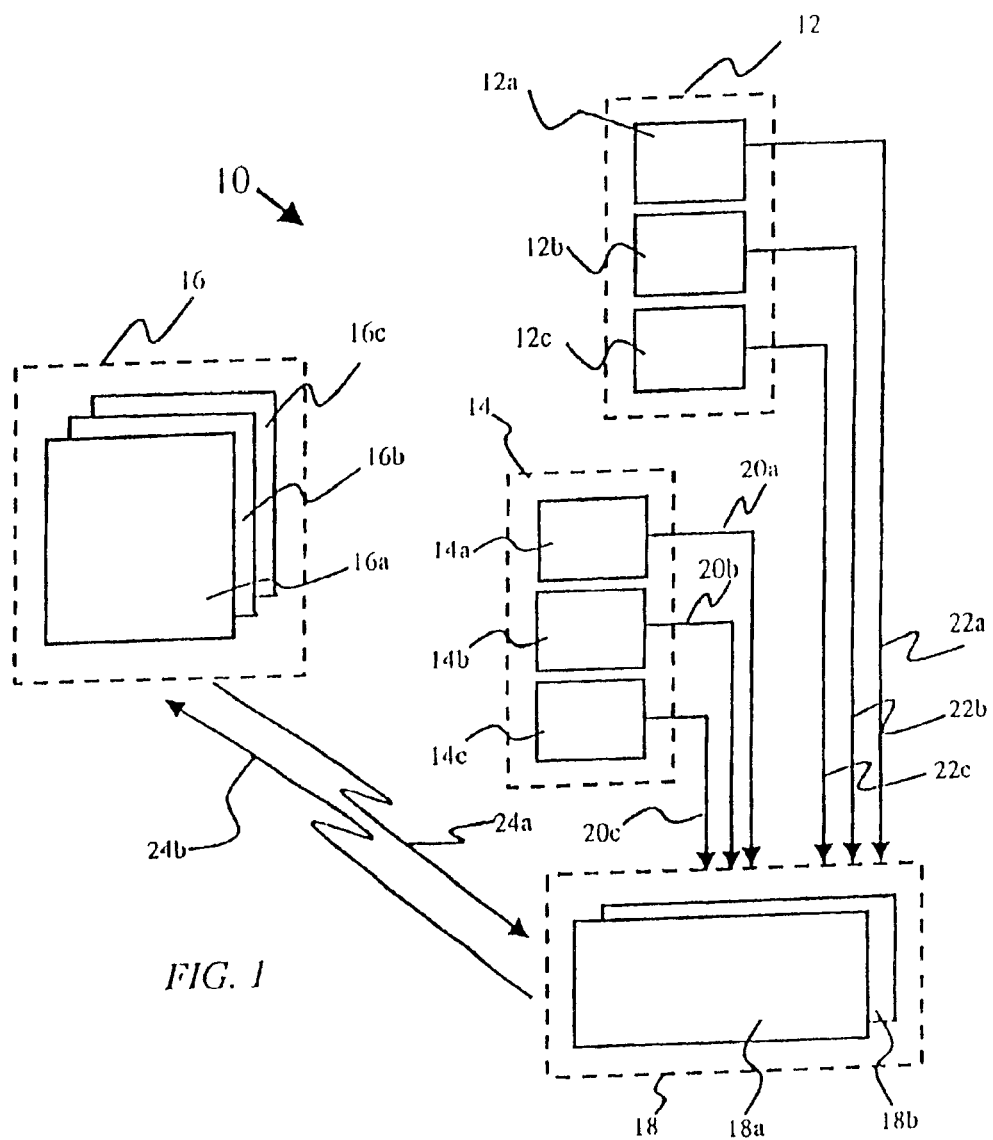
FIG. 1 is a general block diagram of a device network having a plurality of devices in accordance with a preferred embodiment of the invention.

Referring to FIG. 1, a general block diagram of a device network 10 having a plurality of devices in accordance with a preferred embodiment of the invention is illustrated. plurality of devices includes four device sets 12, 14, 16, 18 representing different types of devices of the device network 10.

The four device sets 12, 14, 16, 18 are coupled to each other within the device network 10 via a plurality of communication resources to process signals that include control signals and data signals. Such communication resources include communication cables 20, 22 and radio frequency (RF) channels 24. In FIG. 1, these communication resources 20, 22, 24 are labelled with alphabetic suffixes to distinguish different communication resources for each type.

The device sets 12, 14 provide target devices 12a, 12b, 12c, 14a, 14b, 14c such as, for example, electrical or electronic appliances. These appliances include air conditioners, television sets, stereo sound systems, photocopiers, printers or screen displays. Hence, for an office environment in which the device network 10 is applied, a device set 14 can represent printers and a device set 12 can represent screen displays, including projection displays.

The device set 16 provides selecting devices 16a, 16b, 16c such as, for example, user workstations, mobile terminals, personal digital assistants (PDAs) or any handheld devices that are movable relative to the target devices 12a, 12b, 12c, 14a, 14b, 14c. In addition, the selecting devices 16a, 16b, 16c also allow for user input to select one or more target devices.

The device set 18 provides controllers 18a, 18b that are coupled to the target devices 12a, 12b, 12c, 14a, 14b, 14c and the selecting devices 16a, 16b, 16c via the communication cables 20, 22 and the RF channels 24, respectively. These are duplex mode communications channels.

Figure 2:
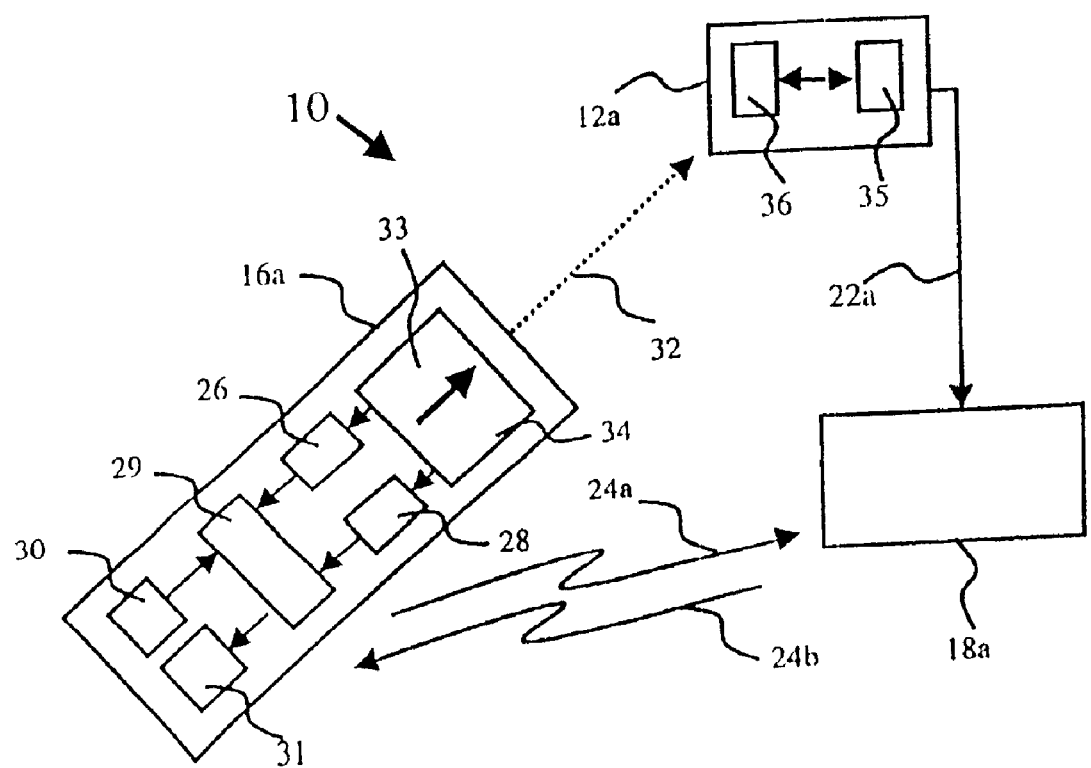
FIG. 2 is a general block diagram illustrating a selecting device pointing to a target device in the device network of FIG. 1.

Using the selecting device 16a, the target device 12a and the controller 18a as examples, FIG. 2 illustrates one embodiment of a selecting device 16a (e.g. a handheld unit) pointing to the target device 12a (e.g. a printer) within the device network 10.

Further illustrated in FIG. 2 is a pointing axis 32 along which the selecting device 16a is aligned when pointing to the target device 12a. The selecting device 16a is illustrated with a display 33 to provide pointing indicia, such as, for example, an arrow 34 for pointing to the target device 12a in alignment to the pointing axis 32. However, the display 33 is an optional feature that may not be necessary so long as a user can set alignment with the pointing axis 32 for the selecting device 16a.

The selecting device 16a has means for sensing position and orientation to thereby provide position and orientation data when pointing to the target device 12a, means for generating control signals including the position data, and means for transmitting the at least one control signal via the RF channel 24a. The controller 18a can be a hub or node controller, for example. The controller 18a passes data and control signals to the target device (e.g. printer) when that device is selected.

More specifically, the sensing means is in the form of a spatial sensor 26 for determining the unit's position using a co-ordinate system relative to a reference location of the device network 10. One suitable form of sensor is a miniature accelerometer whose output (acceleration) is doubly integrated over time to obtain position. One such device is manufactured by Analog Devices of Norwood, Mass., USA (www.analog.com), having part no. ADXL505. It may also be desired to reduce errors of measurement by employing a recalibration technique which takes place when a selecting device comes into proximity with a fixed (or anchor) reference device. Alternatively, or additionally, Kalman filtering techniques can be applied to overcome the effect of errors being accumulated over long periods of time. Alternatively, if the RF communication used is of the UWB type, position data of high accuracy can be obtained using means specific to UWB, such as described in U.S. Pat. No. 6,002,708 titled Spread Spectrum Localizers, issued to Fleming and Kushner on Dec. 14, 1999, the contents of which are incorporated herein by cross-reference. This latter method will be preferred as UWB communication gains prevalence, and has the advantage that accelerometers are not required.

The sensing means further includes an angular sensor 28 for determining the orientation of the selecting device 16a at its current position. This orientation is based on at least two angles relative to two corresponding reference axes of the device network 10. The angular sensor 28 can be, for example, an angle sensing gyroscope, or a sensor that obtains the orientation by integrating the angular rate output of an angular rate sensing gyroscope over time. An example of an angle sensing gyroscope is that identified by item no. "B99-003" from the University of California at Berkeley (http://berkely.edu/mems.html). Examples of suitable angular rate sensing gyroscopes are models ENC-03J and ENV-05D052, from Murata Manufacturing Co. of Japan.

Figure 3:
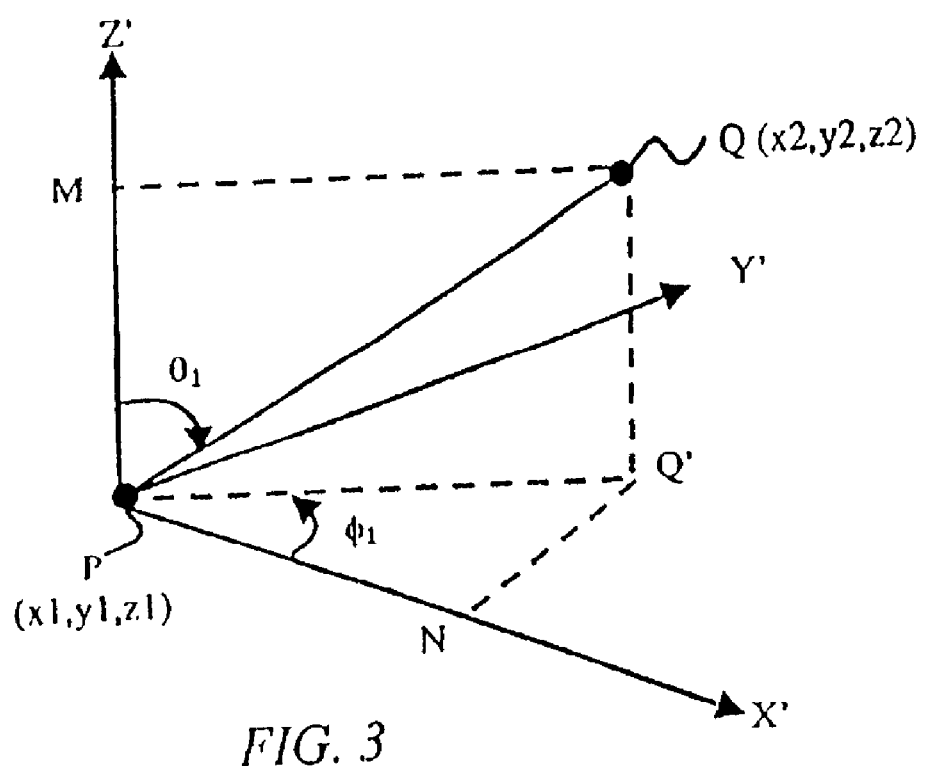
FIG. 3 illustrates a co-ordinate system for the device network of FIG. 1.

The co-ordinate system that is applied in the device network 10 is illustrated by FIG. 3. As shown, three mutually orthogonal axes of the co-ordinate system correspond to, for example, an X-axis, a Y-axis and a Z-axis of a geometric Cartesian co-ordinate system. Position sensing, or positioning, establishes the position of the selecting device 16a in space, in terms of the geometric Cartesian co-ordinates (x,y,z). Orientation, or the direction in which the selecting device 16a is aligned along a pointing axis towards the target device 12a, is measured as two angles ($\phi,\theta$).

For convenience, this specification assumes the use of (x,y,z) and ($\phi,\theta$) to represent the position and the orientation of a device 12, 14, 16, respectively. Other equivalent co-ordinate systems, though not described, can be applied in the embodiments of this invention since co-ordinates and angles in one co-ordinate system can be used to compute corresponding co-ordinates and angles in such other equivalent co-ordinate systems.

The choice of the origin (0,0,0) is unimportant, since distances measured using the co-ordinate system applied in the embodiments of this invention are relative distances. The choice of the mutually orthogonal axes is also unimportant. Generally, but not necessarily so, the Z-axis is aligned to the gravitational "up" direction. Consequently, this allows the X-axis or the Y-axis to align with the magnetic meridian of the Earth at some chosen point, thus providing a convenient definition of all three axes. Any other definition may equally well be used, as long as a consistent use is guaranteed. It is necessary that all devices 12, 14, 16 that participate in the described computation refer to the same co-ordinate system and axes of reference for consistency.

Referring once again to FIG. 3, the selecting device 16a is positioned at point P with co-ordinates ($x_1,y_1,z_1$) and ($\phi_1,\theta_1$) to denote, respectively, the position and the orientation of the selecting device 16a. Let ($x_2,y_2,z_2$) denote the co-ordinates of the target device 12a, which is at the position represented by point Q. X', Y' and Z' are parallels to the X,Y,Z axes such that they pass through point P. Accordingly, Q' is the projection of Q on the X'Y' plane. Then, $\phi_1$ is the angle between the X axis and PQ'. $\theta_1$ is the angle between the Z axis and the vector PQ. N and M are projections of Q on the X' and Z' axes respectively, as in FIG. 3.

From an analysis of triangle PQ'N, $$\tan(\phi_1) = Q'N/PN = (y_2-y_1)/(x_2-x_1) \quad \text{(Equation 1),}$$

and from triangle PQM, $$\cos(\theta_1) = PM/PQ = (z_2-z_1)/d \quad \text{(Equation 2),}$$

where d=PQ, which is the distance between the selecting device 16a at point P and the target device 12a at point Q.

Equation 1 and Equation 2 provide for the determining of the position and the orientation of the selecting device 16a and the position of the target device 12a in the embodiments of this invention. Clearly, the target device's position also must be known in terms of ($X_2, Y_2, Z_2$).

The generating means of the selecting device 16a comprises a signal processor 29 for processing the position and orientation data, provided as co-ordinates, that are based on the co-ordinate system described in the above. The signal processor incorporates the position and orientation data into a control signal. Thereafter, the transmitting means, comprising a transmitter 31, transmits the control signal via the RF channel 24a to the controller 18a. An example of the transmitting means is a Bluetooth™ RF wireless communication interface. The control signal may be encoded, for example, as a message packet containing the position and orientation data, which is communicated over a Bluetooth™ connection.

The selecting device 16a further comprises a user input means 30 that can be, for example, a keypad. The input means 30, coupled to the signal processor 29, enables a user to provide user inputs to activate the signal processor 29 to determine the position and the orientation of the selecting device 16a.

The target device 12a comprises an interface 35 for receiving, via the communication cable 22a, data signals and control signals from the controller 18a. Such an interface 35 includes communications elements that are generally known in the art. In addition, the target device 12a further comprises a signal processor 36, coupled to the interface 35, for processing control signals having embedded position data. Such control signals include target control signals received from the controller 18a that provides the necessary reference position data.

Figure 4:
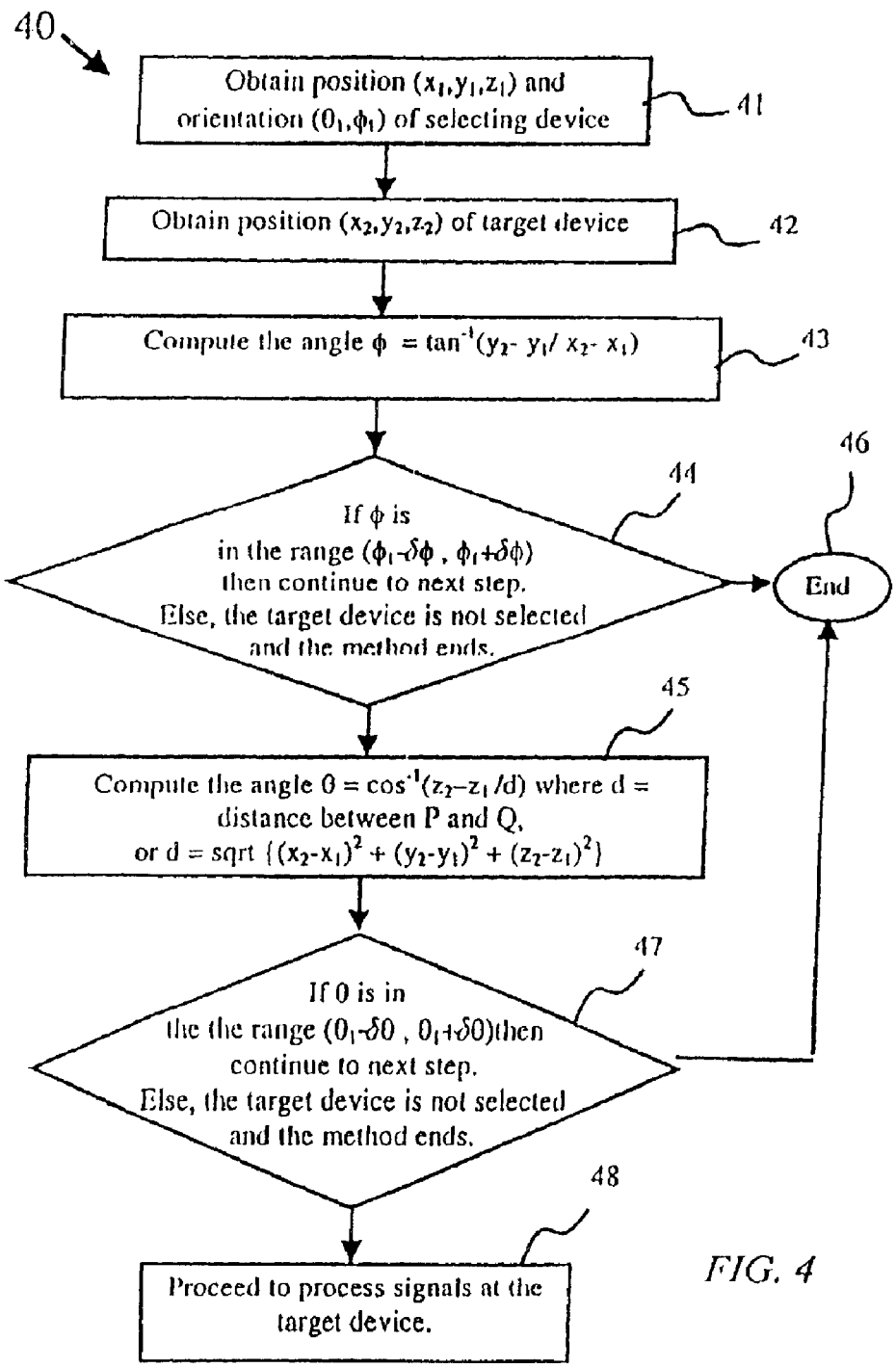
FIG. 4 is a flowchart illustrating processing of position data by a controller of the device network of FIG. 1.

The processing steps 40, illustrated in the flowchart of FIG. 4, describe the method by which the controller (e.g. 18a) determines whether a target device (e.g. 12a) is selected or not, based on the position and orientation data of the selecting device (e.g.) 16a, and the position data of the target device (e.g. 12a). Processing of these position and orientation data is as illustrated in the flowchart of FIG. 4.

The processing 40 starts at step 41 in which the position co-ordinates ($x_1,y_1,z_1$) and the orientation co-ordinates ($\phi_1,\theta_1$) of the selecting device 16a are obtained from the control signal transmitted from the selecting device 16a. Following step 41, the processing 40 continues to step 42 to obtain the known position co-ordinates ($x_2,y_2,z_2$) of the target device 12a. The controller 18a then computes the angle $\phi$ at step 43 using:

$$\phi = \tan^{-1}\{(y_2-y_1)/(x_2-x_1)\},$$

Following the computation of $\phi$, the processing 40 continues to decision step 44 in which the controller 18a determines whether $\phi$ is in the neighborhood of $\phi_1$, i.e., in the range ($\phi_1-\delta, \phi_1+\delta\phi$) where $\delta\phi$ is a suitably chosen angular window.

The value of $\delta\phi$ may be computed based on the angle subtended by the breadth of the target device at the selector, and the accuracy of orientation required for selection to occur. For example, $\delta\phi = k*½*\tan^{-1}(w/PQ)$ where w is the breadth of the target device facing the selector, and k is a constant whose nominal value is 1, and may be increased or decreased to widen or narrow the window of selection.

With a "Yes" following decision step 44, the processing 40 continues to step 45. At step 45, the angle $\theta$ is computed using:

$$\theta = \cos^{-1}(z_2-z_1/d),$$

where $$d = \text{distance between } P \text{ and } Q$$

$$sqrt\{(x_2-x_1)^2 + (y_2-y_1)^2 + (z_2-z_1)^2\}.$$

Otherwise, with a "No" following decision step 44, the processing 40 stops at end step 46 and the target device 12a is therefore not selected.

At decision step 47, upon computation of the angle $\theta$, the controller determines whether $\theta$ is in the range ($\theta_1-\delta\theta, \theta_1+\delta\theta$) where $\delta\theta$ is a suitably chosen angular window.

The value of $\delta\theta$ may be computed based on the angle subtended by the height of the target device at the selector, and the accuracy of orientation required for selection to occur. For example, $\delta\theta = k*½*\tan^{-1}(h/PQ)$ where h is the height of the target facing the selector, and k is a constant whose nominal value is 1, and may be increased or decreased to widen or narrow the window of selection.

With a "Yes" following decision step 47, the processing 40 continues to step 48 at which the target device 12a is selected. Otherwise, the processing 40 does not select the target device 12a and, with a "No", stops at end step 46.

Figure 5:
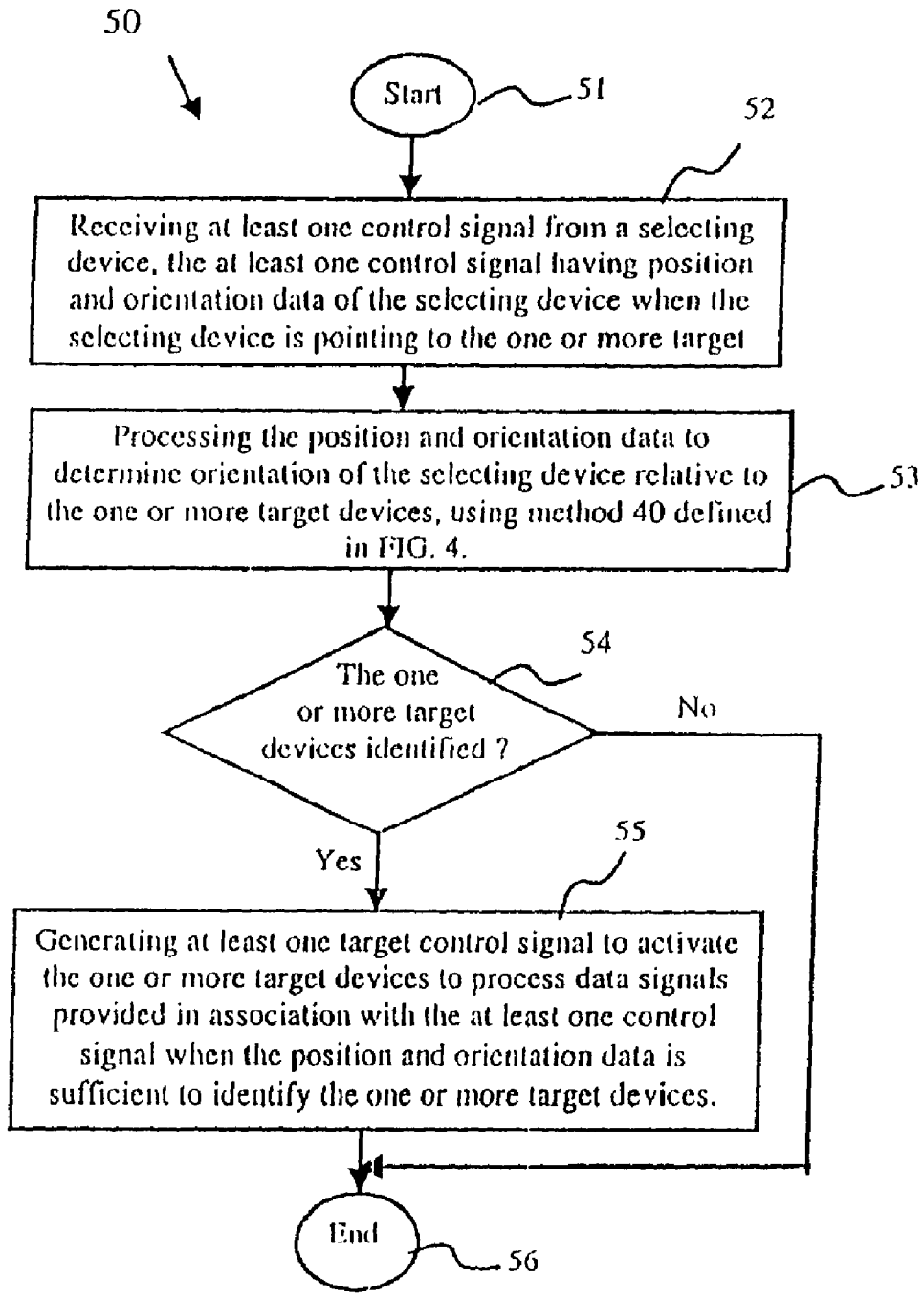
FIG. 5 is a flowchart of a method for selecting the target device in FIG. 2.

Referring now to FIG. 5, a method 50 for selecting one or more target devices in the device network 10 is illustrated with a flowchart. Using the target device 12a, the selecting device 16a and the controller 18a shown in FIG. 2, the method begins at step 51 and proceeds to step 52 in which the controller 18a receives at least one control signal from the selecting device 16a. The control signal has the position data of the selecting device, for example 16a, when the selecting device 16a is pointing to the target device, for example, 12a.

Thereafter, the method 50 proceeds to step 53 at which the controller 18a processes the position and orientation data to determine the position and the orientation of the selecting device 16a relative to the target device 12a. Continuing on to decision step 54, the controller 18a determines whether the target device 12a can be identified based on the position data provided by the control signal, using the above-described method 40.

Upon a 'Yes' result following decision step 54, the method 50 proceeds to step 54. In step 54, the controller 18a generates at least one target control signal to activate the target device 12a to process data signals provided in association with the control signal from the selecting device 16a when determined that the position data is sufficient to identify the target device 12a.

Otherwise, upon a 'No' result following decision step 54, the method 50 ends, and the target device 12a is not selected. Such a situation may occur when, for example, the pointing axis 32 of the selecting device 16a is not appropriately or sufficiently aligned towards the target device 12a.

The method 50 describes selection of a single target device 12a from the device set 12. However, when the pointing axis 32 may be determined to be pointing towards more than one target device in the device set 12, e.g., due to target devices being too closely located and/or angular windows $\delta\phi$, $\delta\theta$ being too wide to allow for discrimination, or for any other reasons. In such cases, different selection criteria may be applied to discriminate and narrow the selection, in conjunction with method 50 as described. For example, one of the selection criteria is to use distance to identify a desired target device which is closest to the selecting device, when the targets are collinear with the selector. Alternatively, another selection criteria is to use attribute matching such as, for example, choosing the least used target device from the device set 12. A further selection criteria is to have the user select the target device 12a interactively via a display menu viewable on the display 33. Yet a further selection criteria is to have a user or an administrator of the target device 12a determine whether to process the at least one target control signal and determine whether to enable selection of the target device 12a. These methods can be combined with the above-described method 50 to narrow the selection, as follows.

For example, when device set 12 is a set of printers, a load balancing criteria may be applied such that controller 18a keeps track of the service load of each printer, and deems the least loaded printer as the selected target. Alternatively, controller 18a may send a control signal back to selecting device 16a, incorporating a list of the one or more targets (say 12b,12c) that are eligible for selection, optionally accompanied by their descriptions. Then, device 16a displays this list to the user on the display 33, allowing an interactive selection to be performed by the user, the resulting choice (e.g. 12c) being transmitted to controller 18a in the form of a control signal, whereby controller 18a selects the chosen target (12c).

It is also possible to select more than one target device from either the device set 12 or the device set 14 depending on how the signal processor 29 processes the one or more control signals and the user inputs. For example, the user, by keeping the user input means 30 activated, places the selecting device 16a in a scanning mode. In the scanning mode, a sweeping motion is made with the selecting device 16a to select more than one target device from the device set 12 or the device set 14. The processing 40 and the method 40 is then activated in succession for the target devices 12a,12b,12c,14a,14b,14c are then sequentially selected.

Figure 6:
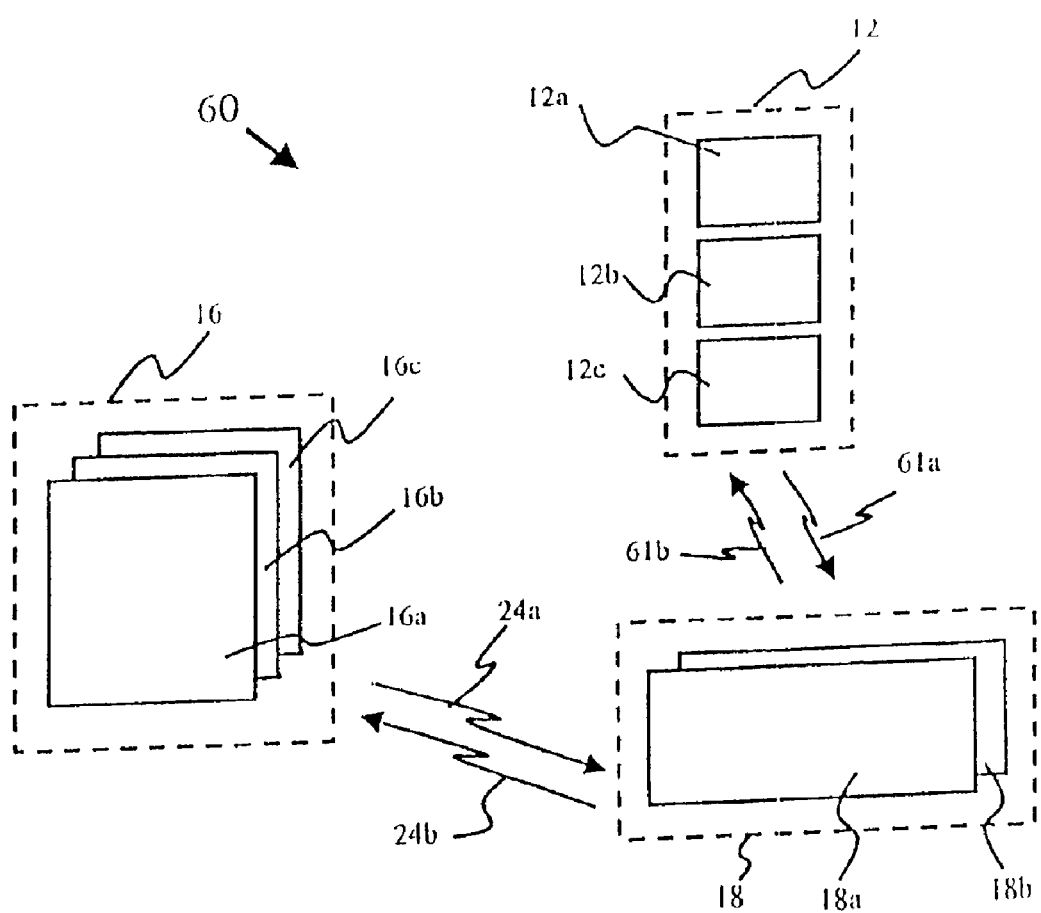
FIG. 6 is a general block diagram of a device network in accordance with an alternate embodiment of the invention.

A schematic block diagram shown in FIG. 6 illustrates a device network 60 in accordance with an alternate embodiment of the invention. In the device network 60, the communication resources coupling the controllers 18a, 18b to the target devices 12a, 12b, 12c in the device set 12 are RF or IR channels 61a, 61b. Hence, the device network 60 represents a wireless device network in which signals, such as control signals and data signals, are communicated via RF or IR channels 24a, 24b, 61a, 61b.

Yet another alternate embodiment of the invention employs target devices (e.g. 12, 14) that are computationally inactive; for example, pictures hanging on a wall or shelves in a supermarket. Instead, their position data is stored in the controller 18a, and thus communication resources 20, 22 are not necessary in this embodiment. The act of selection of a target, e.g. 12a, is determined by the controller 18a using method 50 and 40 as previously described. The selection of a target causes an action to be performed by the controller, which, in this case, depends on the identity of the selected target but, in contrast to the embodiments discussed previously, does not involve communication with the selected target. For example, targets 12a, 12b, 12c, 12d may be paintings hanging on a wall, such that the selection of a target, 12a, causes controller 18a to, for example, send a control signal to the selecting device 16a, incorporating information relating to the painting 12a, which is then displayed on display 33 of device 16a. Likewise, in a supermarket browsing application, information about the items on the shelf may be presented on the display when the shelf is selected by pointing to it.

The advantages of the preferred embodiments of the invention are manifold. One advantage of the preferred embodiments of the invention becomes apparent as selecting devices, e.g. PDAs, are increasingly equipped with RF communication, e.g. using Bluetooth. The invention disclosed here permits such selecting devices, that are capable of wireless communication, with no added hardware such as IR, to perform target selection. This means that the selection functionality is implementable purely in software and on top of off-shelf hardware, which is cost-effective.

Yet a further advantage of the preferred embodiments of the invention is that selecting a target device does not require directional communication resources such as infrared channels. Hence, inherent problems such as signal interferences from other devices using such directional communication resources and operating in the same device network are not encountered in the device networks of the invention.

A third advantage of the embodiment involving computationally inactive targets, for example, supermarket shelves, is that no communication hardware need to be installed for every such target, resulting in tremendous savings of hardware cost when compared to existing techniques.

Another embodiment of the invention operates on the principle of determining only one angle of a orientation. In other words, a 'plane of orientation' is determined rather than a 'pointing line'. This is less desirable, however, as unwanted objects may be in the plane and therefore selected. Some degree of filtering would be required, as discussed above with respect to 'narrowing the selection'.

In the foregoing description, device networks, a selecting device, a target device and a method for selecting a target device in the device networks in accordance with preferred embodiments of the invention are described. Although preferred embodiments are described, it shall be apparent to one skilled in the art in view of these preferred embodiments that numerous changes and/or modifications can be made without departing from the scope and spirit of the invention.

I claim:

1. A device network having selectable target devices, said device network comprising:
   a controller device;
   one or more target devices in communication with said controller device; and
   one or more selecting devices, each of which is movable relative to said target devices, and includes:
      means for sensing position and orientation to provide data therefor;
      means for generating at least one control signal, incorporating said position and orientation data in response to a user input; and
      means for transmitting said control signals via at least one of a plurality of communication resources to said controller device; and
   wherein said controller device acquires and stores actual location information for each target device, and assesses correspondence of said position and orientation data with said actual location data, and if there is correspondence, outputs a control signal to select said target device to be operative;
   a pointing axis along which the selecting device is aligned when selecting the one or more target devices; and
   wherein the at least one of the selecting devices further includes pointing indicia for pointing to target devices in alignment to the pointing axis.

2. The device network of claim 1, wherein said controller assesses correspondence from the selecting device position and orientation and said actual target location by deriving a target orientation, and determining correspondence of said target orientation with said orientation data.

3. The device network of claim 2, wherein said position sensing means comprises an accelerometer whose output is doubly integrated to give an output of position, or a positioning means using UWB (Ultra Wide Band).

4. The device network of claim 3, wherein said orientation sensing means comprises a gyroscope.

5. The device network of claim 4, wherein said each selecting device includes a pointing means to line up a said target device.

6. The device network of claim 5, wherein said pointing means is a display, printed indicium, or pointed shape.

7. The device network of claim 1, wherein said orientation data includes angles between a ray joining the respective points in a three-dimensional Cartesian system and two respective axes of said system.

8. The device network of claim 1, wherein communication between said selecting devices and said controller device is wireless.

9. The device network of claim 8, wherein said wireless communication is either RF (radio frequency) or IR (infrared) type.

10. The device network of claim 1, wherein communication between said target devices and said controller device is wired or wireless.

11. The device network of claim 1, wherein the controller is configured to select the least loaded target device if the pointing axis is aligned with more than one target device.

12. A selecting device for selecting one or more target devices in a device network, said selecting device comprising:
   means for sensing position and orientation to provide data therefor;
   means for generating at least one control signal, incorporating said position and orientation data, in response to a user input; and
   means for transmitting said control signals via at least one of a plurality of communication resources to a controller device;
   a pointing axis along which the selecting device is aligned when selecting the one or more target devices; and
   wherein the at least one of the selecting devices further includes pointing indicia for pointing to target devices in alignment to the pointing axis.

13. The selecting device of claim 12, wherein said position sensing means comprises an accelerometer whose output is doubly integrated to give an output of position, or a positioning means using UWB (Ultra Wide Band).

14. The selecting device of claim 13, wherein said orientation sensing means comprises a gyroscope.

15. The selecting device of claim 14, wherein said each selecting device includes a pointing means to line up a said target device.

16. The selecting device of claim 12, wherein said transmitting means is wireless.

17. The selecting device of claim 16, wherein wireless communication is either RF (radio frequency) or IR (infrared) type.

18. The selecting device of claim 12, wherein the controller is configured to select the least loaded target device if the pointing axis as aligned with more than one target device.

19. A device network having selectable target devices, said device network comprising:
   a controller device;
   one or more targets; and
   one or more selecting devices, each of which is movable relative to said targets, and includes:
      means for sensing position and orientation to provide data therefor;
      means for generating at least one control signal, incorporating said position and orientation data in response to a user input; and
      means for transmitting said control signals via at least one of a plurality of communication resources to said controller device; and
   wherein said controller device stores actual location information for each target, and assesses correspondence of said position and orientation data with said actual location data, and if there is correspondence, selects said target;
   a pointing axis along which the selecting device is aligned when selecting the one or more targets; and
   wherein the at least one of the selecting devices further includes pointing indicia for pointing to targets in alignment to the pointing axis.

20. The device of claim 19, wherein said controller assesses correspondence from the selecting device position and orientation and said actual target location by deriving a target orientation, and determining correspondence of said target orientation with said orientation data.

21. The device of claim 19, wherein the controller is configured to select the least loaded target device if the pointing axis is aligned with more than one target.

22. A device network having selectable target devices, said device network comprising:

a controller device;

one or more target devices in communication with said controller device; and one or more selecting devices, each of which is movable relative to said target devices, and includes:

means for sensing position and orientation to provide data therefor;

means for generating at least one control signal, incorporating said position and orientation data in response to a user input; and means for transmitting said control signals via at least one of a plurality of communication resources to said controller device; and wherein said controller device acquires and stores actual location information for each target device, and assesses correspondence of said position and orientation data with said actual location data, and if there is correspondence, outputs a control signal to select said target device to be operative;

a pointing axis along which the selecting device is aligned when selecting the one or more target devices; and wherein the controller device is configured to determine if the target devices are within an angular window along the pointing axis.

23. A selecting device for selecting one or more target devices in a device network, said selecting device comprising:

means for sensing position and orientation to provide data therefor;

means for generating at least one control signal, incorporating said position and orientation data, in response to a user input; and means for transmitting said control signals via at least one of a plurality of communication resources to a controller device;

a pointing axis along which the selecting device is aligned when selecting the one or more target devices; and wherein the controller device is configured to determine if the target devices are within an angular window along the pointing axis.

24. A device network having selectable target devices, said device network comprising:

a controller device;

one or more targets; and one or more selecting devices, each of which is movable relative to said targets, and includes:

means for sensing position and orientation to provide data therefor;

means for generating at least one control signal, incorporating said position and orientation data in response to a user input; and means for transmitting said control signals via at least one of a plurality of communication resources to said controller device; and wherein said controller device stores actual location information for each target, and assesses correspondence of said position and orientation data with said actual location data, and if there is correspondence, selects said target;

a pointing axis along which the selecting device is aligned when selecting the one or more targets; and wherein the controller device is configured to determine if the targets are within an angular window along the pointing axis.

* * * * *